April 23, 1963 D. D. MUSGRAVE 3,086,469
ELECTRIC EXPLODER
Filed June 14, 1960
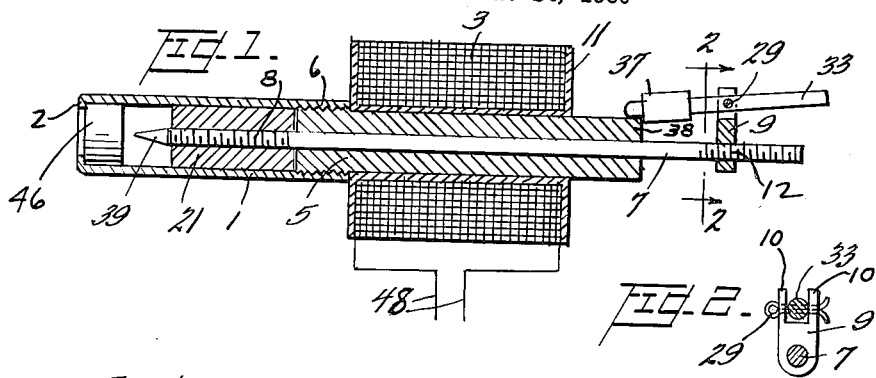
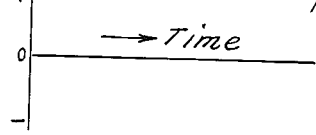
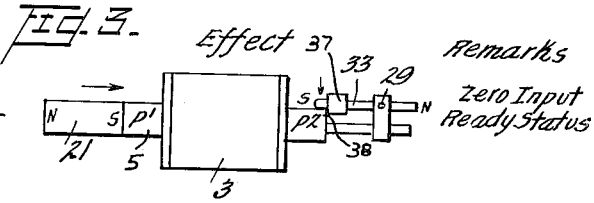
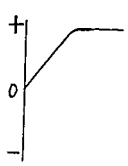
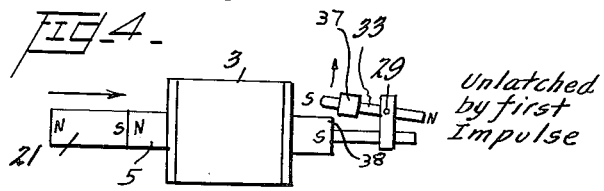
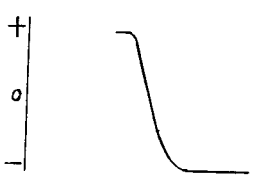
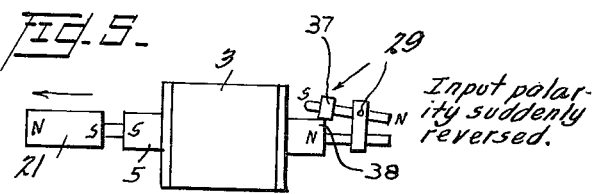
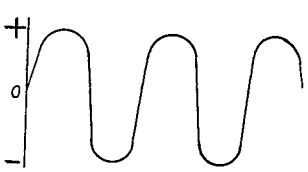
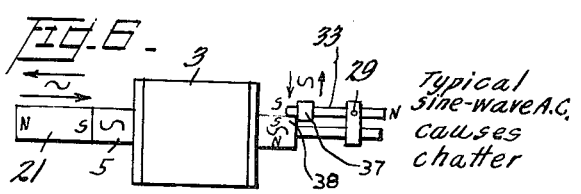
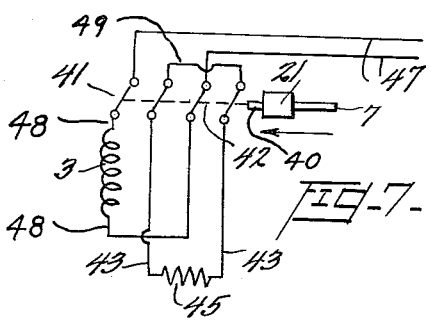
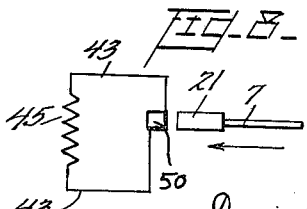
INVENTOR
Daniel D. Musgrave

United States Patent Office 3,086,469
Patented Apr. 23, 1963

3,086,469
ELECTRIC EXPLODER
Daniel D. Musgrave, 8201 Caraway St.,
Cabin John Valley, Md.
Filed June 14, 1960, Ser. No. 35,958
2 Claims. (Cl. 102—70.2)

This application is a continuation-in-part of my copending application Number 851,058, entitled "Electric Circuit Control Systems" now Patent No. 3,039,010. This invention relates to an electric exploder, controlled via a two-conductor circuit, which is not subject to inadvertent operation by typical extraneous electricity.

In the present application the invention will be disclosed as applied to an electric exploder for igniting high energy systems, but it will readily be apparent that its utility is not restricted to such usage. Many types of control and signal circuits are subject to input of extraneous energy, the principal hazard usually occurring in the long conductors between the operator's station and the controlled unit. For this reason the problem sometimes affects non-electric devices which are remotely triggered or controlled by electrical means. For example, spring-driven, electro-mechanical bells are used in some alarm systems, the clockwork escapement being electrically controlled.

The term "extraneous electricity" appears to have originated in the industrial explosives industry to describe unwanted electric energy that may enter electric blasting circuits from the outside. The authoritative Du Pont "Blasters Handbook" lists six principal sources of this electricity: lightning, static, radio transmitters, stray currents, galvanic action and transmission lines. Some of these, such as very-high-frequency transmitters, are relatively new and increasing very rapidly. Others are old but become more serious each year due to the increase in use of electric power and of electric and electronic control systems.

As an example of the range of hazards in industrial operations, mine safety methods must include isolation of sensitive circuits from low-voltage sources such as miners' lamp batteries and from powerful sources of current caused by high voltages, including 250 volts D.C. commonly used for mine haulage and machinery. Blasters test the working place for stray currents before employing electric blasting caps.

Severe as the above hazards may be, they usually require a physical connection in order to transfer energy to the blasting circuit. This is not necessary when the hazard originates in an alternating current source. The juxtaposition of high-frequency sources and sensitive control circuits is particularly frequent in military, aeronautical and space equipment where cube and weight must be kept to a minimum. The consequences of an inadvertent initiation in some of these devices would be so great as to stagger the imagination. The combination of enormous potential, sensitive initiators, and energy radiation systems requires extreme precautions to prevent disaster.

In consideration of the aforementioned difficulties, the principal object of this invention is to provide an electric exploder which is insensitive to typical extraneous electric energy.

Another object is to provide such an exploder which is passive, this is, which tends to remain safe without need of external energy.

These and other objects and advantages of the invention will be apparent from the detailed description hereinafter set forth and from the drawing made a part thereof in which:

FIGURE 1 is a longitudinal section of an exploder embodying the principle of this invention.

FIGURE 2 is a cross-section taken in the plane 2—2 on FIGURE 1.

FIGURES 3, 4, 5 and 6 form a chart showing schematically the effect on the exploder of certain currents.

FIGURE 7 shows an alternate arrangement of work for the device as disclosed in FIGURE 1.

FIGURE 8 shows another alternate work arrangement for the device disclosed in FIGURE 1.

Referring to the drawings in detail, particularly FIGURES 1 and 2, there is shown an electric exploder consisting of a hollow, cylindrical jacket 1, made of brass or some other material of low magnetic permeability, and affixed by threads 6, to an iron core 5. This core 5 is made of some material that will retain only a slight amount of residual magnetism when subjected to a magnetic field. Soft iron would be a suitable material for core 5.

Encircling core 5 is a form or bobbin 11, on which is wound a coil 3 terminating in a pair of conductor leads 48. (The exact construction of the typical electro-magnet coil is well known and need not be detailed here. For purposes of clarity only a simplified coil is shown.) The turns of coil 3 must be suitably insulated. Form 11 is placed in a fixed position on core 5. This could be accomplished by making 5 a force-fit in 11, or by other suitable means.

Conductor leads 48 are to be in electrical contact with a distant control station (not shown).

A hole is bored longitudinally through core 5 to accommodate a slideable rod 7, made of brass, or some other material of low magnetic permeability. In FIGURE 1, rod 7 is shown with a point 39 at one end. Near each end rod 7 is threaded, at 8, and 12.

A cylindrical permanent magnet 21, having a diameter slightly less than the internal diameter of jacket 1 and a threaded longitudinal bore, encompasses rod 7 and is engaged with threads 8. Magnet 21 is thus fixed to and is capable of moving rod 7, as will be explained latter.

Fixed to the other end of rod 7 by threads 12 or other suitable method is clevis 9 which may be of brass or some other material of low magnetic permeability. A permanent magnet, 33, is pivotable around cotter pin 29 in fork 10 of clevis 9. Permanent magnet 33 may be referred to as the latch magnet. Latch magnet 33 may be generally cylindrical in shape and has a transverse hole approximately at its balance point to permit cotter pin 29 to pass through it. Forks 10 of clevis 9 are also drilled to accommodate cotter pin 29 which may be fabricated of some material of low magnetic permeability.

A collar 37, also made of material having low magnectic permeability, is shrunk or otherwise affixed to latch magnet 33. As shown in FIGURE 1 collar 37 may abut against core 5 at its face 38.

In FIGURE 1, the end 2 of jacket 1 is upset to retain in position a primer, 46, which is a snug fit in jacket 1. The work to be performed upon demand by the unit shown in FIGURE 1 is the stabbing of primer 46 by point 39 of rod 7. Many types of stab, friction and impact primers are available in commerce and their interior structure need not be detailed here.

FIGURE 7 shows schematically an alternate arrangement for firing an electric igniter or squib. The resistance bridgewire of the igniter is indicated at 45 in the circuit scheme. From bridgewire 45 a pair of conductors 43 lead to the output side of four-pole double-throw switch 41. On the input side, two of the poles are connected by shunt 49, and to the other two are connected conductors 47, coming from a distant control station (not shown).

To the remaining two output poles of the switch are connected leads 48 to coil 3. The contact blades of switch 41 are linked by gang piece 42 which is abutted against the protruding end 40, of rod 7. Magnet 21 and rod 7 are shown schematically, the arrow below them indicating the direction of their motion to throw the switch. The switch assembly would be substituted for primer 46 in FIGURE 1 when this arrangement is used. Electric caps and squibs are in common use and their construction need not be detailed here.

FIGURE 8 shows schematically another arrangement for firing an electric ignitor or squib. From the output faces of a piezo-electric crystal 50 conductors 43 lead to the ignition bridgewire 45. Crystal 50 would be substituted for primer 46 in FIGURE 1. Rod 7 would be assembled flush with magnet 21 so that motion in the direction of the arrow would permit magnet 21 to exert a compressive force on crystal 50.

FIGURES 3, 4, 5 and 6 are schematic views, showing the effect produced upon the exploder by various input situations. In FIGURE 3 the unit is assumed to be in the same status as in FIGURE 1 and no current is flowing in the winding of coil 3. The arrow above magnet 21 indicates that it is adhering to core 5 and the arrow near latch magnet 33 indicates that it is also adhering to core 5. It will be noted that collar 37 of latch magnet 33 is in engagement with end face 38 of core 5. The letters "N" and "S" indicate the poles of the permanent magnets, while P¹ and P² indicate the ends of core 5 which will become oppositely magnetized when a current flows in coil 3. Referring to the left side of FIGURE 3 it will be noted that the input (which happens to be zero) is plotted against time. As long as the current in the coil is zero both magnets 21 and 33 will adhere to core 5.

In FIGURE 4 a positive current is being sent through the coil which is so wound that this positive current causes pole P¹ to become a north pole and pole P² to become a south pole. The attraction between magnet 21 and core 5 is greatly increased because their adjacent faces are of opposite polarity. At the same time pole P² becomes a south pole and repels magnet 33, causing it to pivot around cotter pin 29 and disengage collar 37 from face 38 of core 5. The arrows near the permanent magnets show the direction in which they tend to move. It will be noted that although there is no longer mechanical engagement between collar 37 and face 38 to prevent sliding of rod 7 (with its attachments) there is now a greater attraction between magnet 21 and core 5 which serves to prevent such sliding. As long as the positive current flows, latch magnet 33 will remain disengaged and magnet 21 will adhere strongly to core 5.

If the input polarity is suddenly reversed as shown in FIGURE 5, P¹ becomes a south pole and exerts a powerful repulsive force on the south pole of magnet 21, which it has been contacting. At the same time pole P² becomes a north pole and exerts an attraction for the south pole of magnet 33, but this attraction must act through a gap, whereas the repulsion between P¹ and magnet 21 starts with actual contact. The slightest travel of magnet 21 (with rod 7 and clevis 9 affixed) causes collar 37 of magnet 33 to override pole P² and relatching is prevented. The slideable group, consisting of rod 7, magnet 21, and clevis 9 with latch magnet 33 can continue their stroke until point 39 strikes primer 46.

The effect produced by A.C. input, such as might be caused by R-F energy, is shown in FIGURE 6. Alternating current flowing in coil 3 will cause the polarity of poles P¹ and P² to alternate. Each change of polarity will change the relationship of these poles with magnets 21 and 33. The mass of magnet 33 should be so selected that its inertia will not permit unlatching by high-frequency input to coil 3. When so selected, magnet 33 will remain latched during high-frequency input to coil 3 although some chattering effect might be noted. Extraneous energy would be dissipated as heat in coil 3.

If an extraneous D.C. input occurs, it might cause unlatching (if of the proper polarity) but it would have to be reversed suddenly to effect operation as shown in FIGURE 5. If a power failure occurred after unlatching as shown in FIGURE 4 the device will return to the latched status because magnet 33 will be attracted to core 5.

When the alternate arrangement shown in FIGURE 7 is used the method of operation is also that shown in FIGURES 3, 4, and 5 but the work to be accomplished is the throwing of switch 41. This is effected by thrust of end 40 of rod 7 against gang piece 42. Movement of the contact blades breaks the connection of shunt 49 to bridge 45 and places coil 3 on open circuit. At the same time bridge 45 is connected directly to the line via conductors 47, and firing results.

In FIGURE 8 firing will occur when magnet 21 impacts crystal 50 causing a difference of potential between its faces. The resulting flow of current through conductors 43 heats bridgewire 45.

*Operation*

It will be assumed that the device is in the status shown in FIGURE 1 and that the conductors 48 lead to a distant control station where they connect to a pole-changer and a steady current source. By means of the pole-changer a positive pulse is sent through coil 3 and the device assumes the unlatched status shown in FIGURE 4.

Again by means of the pole-changer, the input is suddenly reversed as shown in FIGURE 5 and actuation results in the manner already explained for FIGURE 5.

At the distant station any source can be used which will give the proper input. It need not be a pole-changer and battery. When the arrangement of FIGURE 7 is used conductors 47 are connected to the distant station.

What I claim is:

1. An electric exploder comprising: an electromagnetic coil, a longitudinally bored core of low magnetic retentivity disposed centrally in said coil; a diamagnetic operating rod slideable in the bore of said core; an explosive primer aligned with said rod and separated therefrom; a first permanent magnet pivotably mounted on said rod, said magnet engaging an end portion of said core in the normal locked position of said exploder; a second permanent magnet mounted on said rod; means for applying a current alternately in opposite directions to said coil; said coil being energized by a current applied in one direction to repulse and pivot said first permanent magnet from said core thereby mechanically releasing the engagement of said core and said first magnet to release said rod for movement toward said primer, and to attract said second magnet to said core thus preventing movement of said rod toward said primer; said coil being subsequently energized by a current applied in the opposite direction to repulse said second permanent magnet from said core to move said rod toward and strike said explosive primer.

2. The combination set forth in claim 1 and further characterized by said explosive primer including a piezo electric crystal in alignment with said rod whereby an exploding current is generated when said rod moves toward and strikes said crystal.

References Cited in the file of this patent

UNITED STATES PATENTS

| | | |
|---|---|---|
| 1,940,930 | Wyman | Dec. 26, 1933 |
| 1,987,912 | Rady et al. | Jan. 15, 1935 |
| 2,358,198 | Wyman | Sept. 12, 1944 |
| 2,436,396 | McCaslin | Feb. 24, 1948 |
| 2,544,077 | Gardner | Mar. 6, 1951 |
| 2,640,955 | Fisher | June 2, 1953 |
| 2,655,867 | Jordan | Oct. 20, 1953 |
| 2,764,091 | Hudson | Sept. 25, 1956 |
| 2,806,427 | Hager | Sept. 17, 1957 |
| 2,894,457 | Severance | July 14, 1959 |
| 2,931,462 | Heart | Apr. 5, 1960 |